(12) United States Patent
Wang et al.

(10) Patent No.: US 9,165,011 B2
(45) Date of Patent: Oct. 20, 2015

(54) CONCURRENT CALCULATION OF RESOURCE QUALIFICATION AND AVAILABILITY USING TEXT SEARCH

(75) Inventors: Tianyi Wang, Mountain View, CA (US); Vivek Salgar, Cupertino, CA (US); Darryl L. Watson, Pleasanton, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 193 days.

(21) Appl. No.: 13/251,038

(22) Filed: Sep. 30, 2011

(65) Prior Publication Data

US 2013/0086054 A1   Apr. 4, 2013

(51) Int. Cl.
*G06F 17/30* (2006.01)

(52) U.S. Cl.
CPC ............................. *G06F 17/30168* (2013.01)

(58) Field of Classification Search
CPC ................................................ G06F 17/30168
USPC .......................................... 707/725, 722, 723
See application file for complete search history.

(56) References Cited

U.S. PATENT DOCUMENTS

| | | | |
|---|---|---|---|
| 5,111,391 A | | 5/1992 | Fields et al. |
| 6,049,776 A | * | 4/2000 | Donnelly et al. ............. 705/7.14 |
| 6,385,620 B1 | * | 5/2002 | Kurzius et al. ........................ 1/1 |
| 6,430,562 B1 | | 8/2002 | Kardos et al. |
| 6,470,329 B1 | | 10/2002 | Livschitz |
| 6,657,959 B1 | | 12/2003 | Chong et al. |
| 6,823,315 B1 | * | 11/2004 | Bucci et al. ................... 705/7.16 |
| 7,127,412 B2 | | 10/2006 | Powell et al. |
| 7,155,519 B2 | | 12/2006 | Lo et al. |

(Continued)

FOREIGN PATENT DOCUMENTS

| | | |
|---|---|---|
| EP | 1649381 A2 | 4/2006 |
| EP | 1226533 A4 | 6/2006 |

(Continued)

OTHER PUBLICATIONS

Lixin Zhou, "A Project Human Resource Allocation Method Based on Software Architecture and Social Network", IEEE, 2008, 6 pages.

(Continued)

*Primary Examiner* — Miranda Le
(74) *Attorney, Agent, or Firm* — Vista IP Law Group, LLP

(57) ABSTRACT

A system, for concurrent calculation of resource qualifications (e.g., skills, educational degree, etc) and availability (e.g., availability to work on a project) using text search. The method commences by initiating a flow for requesting resources, the resource request comprising a qualification requirement indication and a time period requirement indication. The method further comprises retrieving candidate resource documents in a manner so as to calculate an overall match score that is based not only on qualifications, but also on availability. The scoring uses a recoded candidate resource document that comprises qualification attributes as well as time period availability to form an overall match score. The recoding can be performed in an administrative flow (e.g., a batch process, and/or a periodically executed update process), and the administrative flow creates recoded candidate resource document that are suited for use with a text search engine capable of processing an extensible markup language document.

17 Claims, 9 Drawing Sheets

(56) References Cited

U.S. PATENT DOCUMENTS

| | | | |
|---|---|---|---|
| 7,617,198 B2* | 11/2009 | Durvasula | 1/1 |
| 7,711,573 B1* | 5/2010 | Obeid | 705/321 |
| 7,739,137 B2 | 6/2010 | Jagtiani et al. | |
| 7,870,117 B1* | 1/2011 | Rennison | 707/706 |
| 7,904,192 B2* | 3/2011 | Chua et al. | 700/100 |
| 8,112,365 B2* | 2/2012 | Foster | 705/321 |
| 8,335,705 B2 | 12/2012 | Ehrler et al. | |
| 8,595,149 B1* | 11/2013 | Obeid | 705/321 |
| 2001/0027481 A1 | 10/2001 | Whyel | |
| 2002/0128894 A1* | 9/2002 | Farenden | 705/8 |
| 2004/0216098 A1 | 10/2004 | Roe et al. | |
| 2005/0004825 A1* | 1/2005 | Ehrler et al. | 705/8 |
| 2005/0080657 A1* | 4/2005 | Crow et al. | 705/8 |
| 2005/0251435 A1 | 11/2005 | Paolella et al. | |
| 2006/0229896 A1* | 10/2006 | Rosen et al. | 705/1 |
| 2007/0016436 A1* | 1/2007 | Kakar | 705/1 |
| 2007/0022188 A1* | 1/2007 | Kohs | 709/223 |
| 2007/0043603 A1* | 2/2007 | Andersen et al. | 705/9 |
| 2007/0136270 A1* | 6/2007 | Harney et al. | 707/4 |
| 2007/0203776 A1* | 8/2007 | Austin et al. | 705/8 |
| 2007/0203851 A1* | 8/2007 | Sudhi | 705/75 |
| 2007/0294092 A1* | 12/2007 | Calannio | 705/1 |
| 2008/0086366 A1* | 4/2008 | Concordia et al. | 705/11 |
| 2008/0239992 A1 | 10/2008 | Krasnyanskiy | |
| 2009/0030787 A1 | 1/2009 | Pon et al. | |
| 2009/0049095 A1* | 2/2009 | Simon et al. | 707/104.1 |
| 2009/0097494 A1 | 4/2009 | Yuan | |
| 2009/0132306 A1* | 5/2009 | Dierking | 705/7 |
| 2009/0132313 A1* | 5/2009 | Chandler et al. | 705/7 |
| 2009/0150367 A1* | 6/2009 | Melnik et al. | 707/4 |
| 2009/0199192 A1 | 8/2009 | Laithwaite et al. | |
| 2009/0299993 A1* | 12/2009 | Novack | 707/5 |
| 2010/0205226 A1 | 8/2010 | Bezancon et al. | |
| 2011/0154231 A1 | 6/2011 | Cherdron et al. | |
| 2011/0184771 A1* | 7/2011 | Wells | 705/7.14 |
| 2011/0184939 A1* | 7/2011 | Elliott | 707/722 |
| 2011/0313963 A1* | 12/2011 | Liu et al. | 706/48 |
| 2012/0089696 A1 | 4/2012 | May et al. | |
| 2012/0123956 A1* | 5/2012 | Chenthamarakshan et al. | 705/321 |
| 2012/0215578 A1 | 8/2012 | Swierz, III et al. | |
| 2012/0215709 A1* | 8/2012 | Nanda et al. | 705/321 |
| 2012/0240062 A1 | 9/2012 | Passmore et al. | |
| 2012/0287885 A1 | 11/2012 | Dai | |

FOREIGN PATENT DOCUMENTS

| | | | |
|---|---|---|---|
| EP | 1846822 A2 | 10/2007 | |
| EP | 1649392 A4 | 5/2009 | |
| EP | 2217980 A2 | 8/2010 | |
| WO | 00/77710 A1 | 12/2000 | |
| WO | 03079152 A2 | 9/2003 | |
| WO | WO 03079152 A2 | 9/2003 | |
| WO | 2005/008403 A2 | 1/2005 | |
| WO | 2005008425 A2 | 1/2005 | |
| WO | 2006/073978 A2 | 7/2006 | |
| WO | 2009/052383 A1 | 4/2009 | |

OTHER PUBLICATIONS

"Ganttic Resource Planner, Online Scheduler" Aug. 27, 2010, 2 pages url: http://www.gaganttic.com.

"ManagePro: Resource Allocation and Project Management Software", Jul. 26, 2010, 4 pages url: http://www.managepro.com/resourceallocation.html.

Patentability Search Report for ORA130474 (6 pages).

A Project Human Resource Allocation Method Based on Software Architecture and Social Network http://ieeexplore.ieee.org/stamp/stamp.jsp?arnumber=4679938.

Project scheduling and resource planning by Ganttic http://www.ganttic.com/.

ManagePro: Resource Allocation and Project Management Software http://www.managepro.com/resourceallocation.html.

NetSuite Resource Management http://www.netsuite.com/portal/products/openair/resource-management.shtml.

Notice of Allowance and Fees Due dated Oct. 24, 2014 for U.S. Appl. No. 13/118,299.

"Field Service Software & Task Scheduling Systems" May 11, 2008, 3 pages url: http://www.mjc2.com/wireless.htm.

"Welcome to the Real-Time Service Enterprise" Mar. 18, 2009, 2 pages http://www.clicksoftware.com/solutions/index.asp.

"Connect + wise mobile" Feb. 13, 2010, 3 pages url: http://www.connectwise.com/connectwise-mobile-1.aspx.

"Service Management Software: ServiceCEO Mobile" Apr. 26, 2010, 4 pages http://www.insightdirect.com/products-overview/.

"Shiftboard: Online Scheduling & Communication" Feb. 12, 2010, 4 pages url: http://www.shiftboard.com/shiftboard-faqs.html.

"Genbook" Feb. 9, 2010, 2 pages url: http://www.genbook.com/genbook-for-you.html.

Notice of Allowance and Fees Due dated Apr. 4, 2013 for U.S. Appl. No. 13/118,260.

Non-final Office Action dated Jun. 5, 2013 for U.S. Appl. No. 13/118,260.

Notice of Allowance and Fees Due dated Dec. 11, 2013 for U.S. Appl. No. 13/118,260.

Non-final Office Action dated May 22, 2014 for U.S. Appl. No. 13/118,299.

* cited by examiner

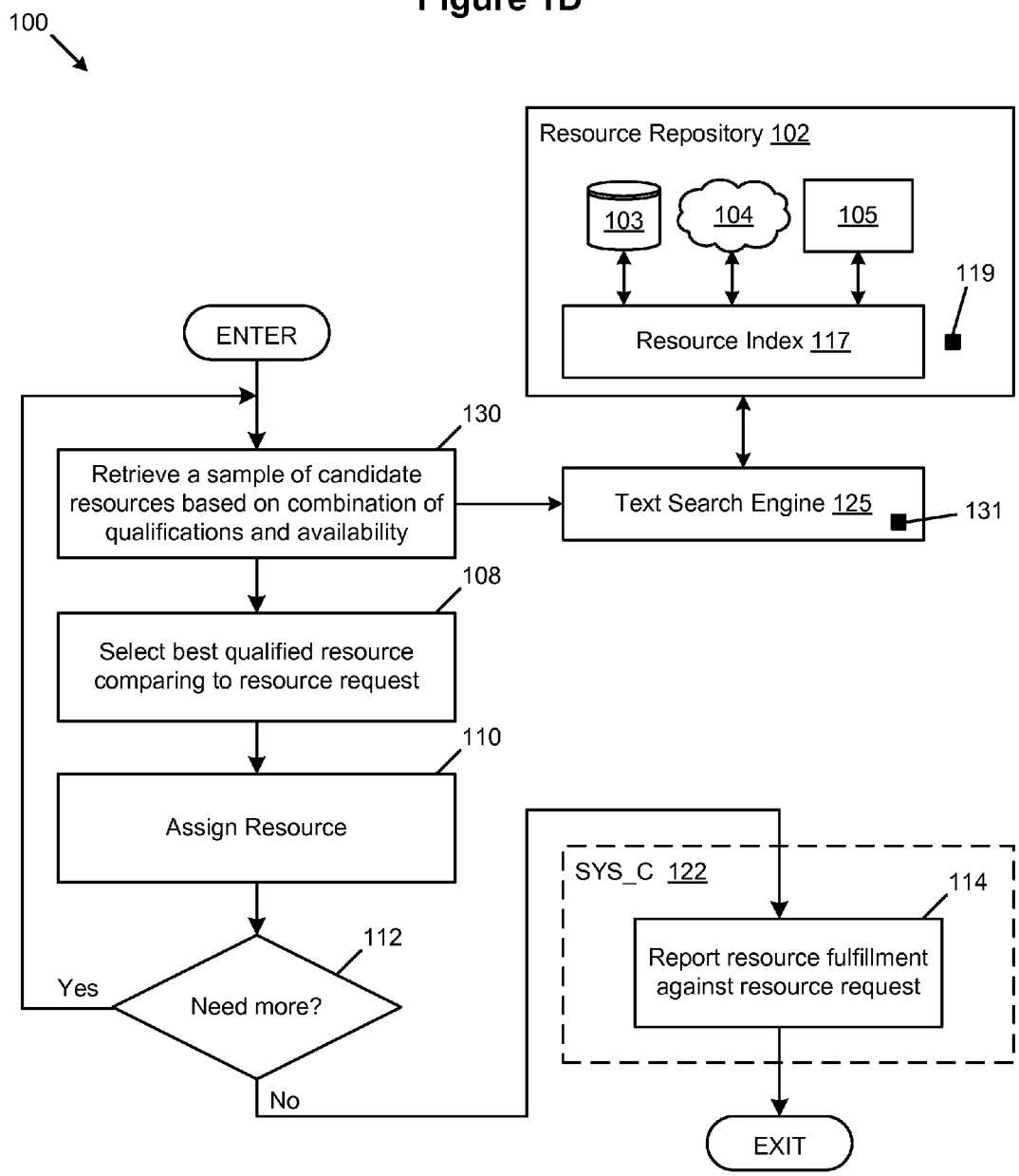

CONCURRENT CALCULATION OF RESOURCE QUALIFICATION AND AVAILABILITY USING TEXT SEARCH

FIELD

The disclosure relates to the field of resource management and more particularly to automated techniques for assigning resources to a project.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A resource management software system is a tool used by resource managers and staffing managers in professional service industries to (a) match resource supply to resource demand, (b) assign the right resources to the right tasks or projects, and (c) do so at the right time. For example, if a skilled Java programmer (a resource) were needed for an eight week programming project in the June and July timeframe, and there was no single Java programmer available for that stretch of time, then a resource management software system might try to source (for example) two Java programmers who can be scheduled sequentially, say a first programmer for four weeks in the June timeframe and a second programmer for four weeks in the July timeframe.

During the staffing process, and to accomplish sourcing based on a given particular skill or level of skill, many resource management software system implementations employ a match engine to locate and score resources based on the given search criteria (e.g., a particular skill and/or a particular level of a skill). The resource demand criteria often is given in a resource request, and a match engine can be configured to calculate a match score over a database of possible resources (e.g., programmers) to help the resource managers find a "best fit" from among known resources.

In some implementations of a legacy resource management software system, a match score is calculated based on two main factors: (1) a qualification match score, for example a ratio or percentage reflecting how much the resource's skills fit into the resource request, and (2) an availability match score, for example a calculated percentage of time a resource is available to work on a particular project within a particular required timeframe.

One approach often taken in legacy systems is to use a search engine to search for resources possessing the requested skills and then to calculate a qualification match score. Then, for any one or more of the resources returned by the search engine, to calculate an availability match score. In legacy systems, the scoring is performed outside the search engine and after the search engine has returned results.

One problem with such an approach that occurs frequently, especially in the case of a large volume of resources, is that candidate resources that might have a skill level (a qualification parameter) close to the requested level are never reported by the search engine. Especially under conditions of tight resources, the resource managers might like to know the availability of such resources, since (for example) a Java programmer of "skill level 2" can accomplish the same programming tasks as a Java programmer of "skill level 3", given more time to complete the programming tasks. Thus, scoring techniques that simultaneously account for resource qualifications together with resource availability are needed.

Moreover, in order to have a quick response time, resource managers will limit the number of resources in the text search result to some relatively small number (such as 50) before performing the match score calculations. This legacy technique suffers from at least two deficiencies: First, when the number of resources in the search results is limited as heretofore described, it is possible that the resource scheduling tasks complete, but using non-optimal resources (since not all possible resources were returned in the limited search results). Second, it is possible that resources with only slightly lower qualifications (e.g., a slightly lower qualification match score) but highly available (e.g., a high availability match score) are not considered. Of course the aforementioned two deficiencies can occur whenever the qualification match score and the availability match score are calculated in two separate steps as just described.

Therefore, there is a need for an improved approach to address the above and other deficiencies of legacy systems for simultaneously scoring resource qualification and availability.

SUMMARY

A method, system, and computer program product for concurrent calculation of resource qualifications (e.g., skills, educational degree, etc) and availability (e.g., availability to work on a project) using text search. The method commences by initiating a flow for requesting resources, which flow receives a resource request, the resource request comprising at least a qualification requirement indication and a time period requirement indication. The method further comprises retrieving candidate resource documents in a manner so as to calculate an overall match score that is based not only on qualifications, but also on availability. The scoring uses a recoded candidate resource document which recoded candidate resource document comprises qualification attributes as well as time period availability to form an overall match score. The recoding can be performed in an administrative flow (e.g., a batch process, and/or a periodically executed update process), and the administrative flow creates recoded candidate resource document that are suited for use with a text search engine capable of processing an extensible markup language document.

Further details of aspects, objects, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1D illustrates an environment for implementing concurrent calculation of resource qualification and availability using text search, according to some embodiments.

DETAILED DESCRIPTION

Some embodiments of the present disclosure are directed to an improved approach for implementing resource management.

When using resource management software systems, resource managers would like to have quick response time and a high degree of accuracy when assigning resources to projects. To accomplish this, an entire repository of candidate resource records should be searched (to return global results rather than local results based on a limited set of iterative searches), and the system should support calculation of resource qualification and time-wise availability in combination.

The paragraph above suggests that two (or at least two) characteristics of resources should be considered together, namely the resource's available time periods, and the resource's skills. And those characteristics should be searchable by a single text search engine or other search engine. Then, both the resource's availability and the resource's qualifications can be used to calculate a match score, possibly using only a single text query. To accomplish this, a method and system can be defined to identify resource available time periods (e.g., time periods that the resources are free to work), and create a document for each resource to include the resource's available time period. Then, load and index the document for search engine to search. Having done so, correctly scored candidate resources can be retrieved after converting search criteria into text query form and invoking a search engine to process the converted query. The resources returned will be based on an overall match score where the candidate's qualification match score and the candidate's time-wise availability is used together in scoring the returned resources.

Figure 1A:
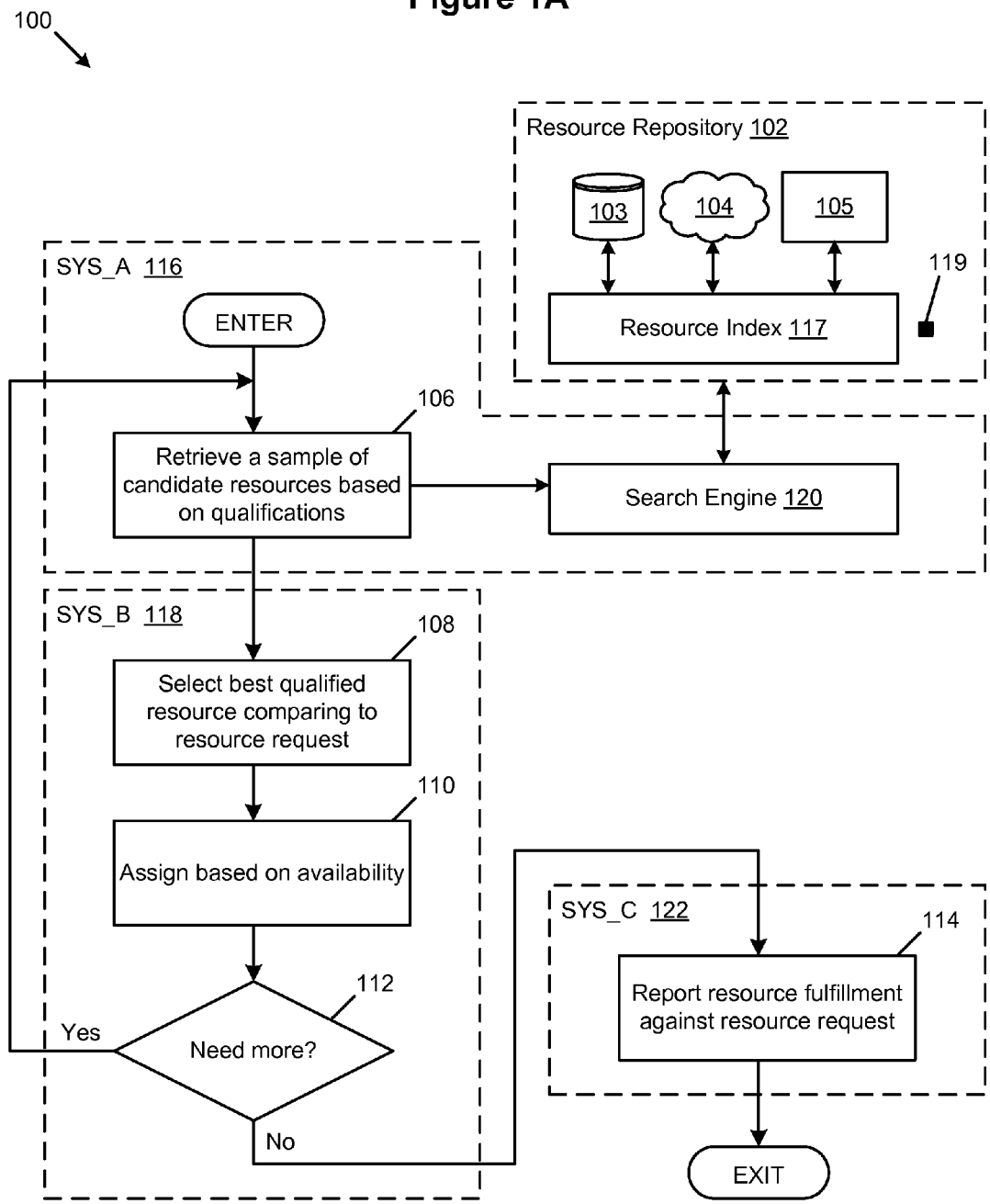
FIG. 1A illustrates an environment for implementing resource qualification and availability using text search with availability calculation performed in a separate operation, according to some embodiments.

FIG. 1A illustrates an environment 100 for implementing resource qualification and availability using text search with availability calculation performed in a separate operation. As shown, the environment 100 comprises a resource repository 102, a system for retrieving candidate resource records (see system SYS_A 116) from the resource repository 102, a system for assigning candidate resources across a project (see system SYS_B 118), and a system for reporting (see system SYS_C 122).

The resource repository 102 comprises storage of candidate resource records 119, which storage can use any persistent storage. For example, persistent storage to store candidate resource records can be formed by descriptions stored within files 103 (e.g., in a file system), candidate resource relations 105 (e.g., within a relational database), or candidate resource records can be formed of data retrieved via a network or cloud 104. Moreover, the resource repository 102 can comprise some portions or all portions of multiple repositories. Also, a resource repository 102 can be comprised of a first portion and a second portion (further described below). The resource repository 102 can be a logical construction, comprised of a first physical system (e.g., to store a first portion), and a second physical system (e.g., to store a second portion), and any of the aforementioned constructions can be accessed via a resource index 117.

The system for retrieving candidate resource records (see system SYS_A 116) operates to retrieve a sample of candidate resource records based on qualifications given in a project specification or a resource request (see operation 106). In this embodiment, a search engine 120 serves to access the resource repository 102, and using various techniques, parses the data retrieved in order to identify candidate resources.

In another system (see system SYS_B 118) retrieved candidate resources are assigned to the project based on availability. Strictly as an example, system SYS_B 118 can assign candidate resources to the project in two steps, namely a step to select the best qualified resource comparing to the resource request (see operation 108), and a step to assign the best qualified resource based on the resource availability (see operation 110). In many situations multiple resources need to be assigned in order to fulfill the staffing requirements given in the project specification, so the aforementioned two steps can be repeated until no more staffing assignments are needed (see decision 112). In determining that no more staffing assignments are needed, a system (e.g., SYS_C 122) can report resource fulfillment against a resource request (see operation 114).

A project specification or a resource request can be provided in a wide variety of forms. For example, a resource request can be codified in a table. Table 1 shows a resource request for one Java Level 3 programmer and three Java Level 2 programmers for the period January 2011 through March 2011.

TABLE 1

Resource Request Example

| Quantity | Qualification | Proficiency Level | Period |
|---|---|---|---|
| 1 | Java Programmer | Java Level 3 | JANUARY 2011-MARCH 2011 |
| 3 | Java Programmer | Java Level 2 | JANUARY 2011-MARCH 2011 |

In exemplary embodiments, a resource request comprises a listing of resource requirements, the requirements including a qualification requirement indication, a proficiency level requirement indication, and a time period requirement indication, the time period requirement indication expressing the demands of the project for the corresponding resource. The corresponding resource is matched to one or more candidate resource records, which match operations and candidate resource records are further discussed below.

Characteristics of the resources can be codified in a variety of ways, in particular in extensible markup language (XML) code. Strictly as an example, the following XML code segment gives a description of a resource qualified to be assigned as a Java programmer having proficiency level "Java Skill 3", and an academic degree, "Bachelor of Business Administration". Also shown (and further described below) are indications of availability to be assigned to a project, namely in the weeks with "weekId" equal 2, 3, and 4.

```
<Resource>
    <Qualifications>
        <QUAL>Java Skill</QUAL>
        <PRO>Java Skill 3</PRO>
        <QUAL>PS Query</QUAL>
        <PRO>PS Query 4</PRO>
        <DEG>Bachelor of Business Administration</DEG>
    </Qualifications>
    <AvailableTime>
        <WeekId> 2</WeekId>
        <WeekId> 3</WeekId>
        <WeekId> 4</WeekId>
    </AvailableTime>
</Resource>
```

As for operations to assign a selected resource based on his or her availability, a table or chart or other data structure can serve to define the temporal aspects of resource requirements. For example, Table 2 shows a project requiring one unit of "Java Level 3", and three units of "Java Level 2" for the period January 2011 through March 2011.

TABLE 2

Resource Request or Requirement Data Structure Example

| Resource | Proficiency Level | Period |
|---|---|---|
| Java Programmer | Java Level 3 | JANUARY 2011-MARCH 2011 |
| Java Programmer | Java Level 2 | JANUARY 2011-MARCH 2011 |
| Java Programmer | Java Level 2 | JANUARY 2011-MARCH 2011 |
| Java Programmer | Java Level 2 | JANUARY 2011-MARCH 2011 |

Of course, a resource request or requirement data structure can describe the period using any convenient notation or granularity. For example, Table 3 shows the period broken into a granularity of weeks. Further, the availability of a resource "ABC", namely one unit of "Java Level 3", is shown as being assigned for the available weeks.

TABLE 3

Resource Assignment Data Structure Example (partially populated)

| Resource | Proficiency Level | WeekId = 1 | WeekId = 2 | WeekId = 3 | WeekId = 4 |
|---|---|---|---|---|---|
| Java Programmer | Java,Level 3 | — | ABC | ABC | ABC |
| Java Programmer | Java Level 2 | | | | |
| Java Programmer | JavaLevel 2 | | | | |
| Java Programmer | Java Level 2 | | | | |

The resource assignment data structure example of Table 3 is only partially populated, that is, it shows only the assignment of the resource possessing proficiency of "Java Level 3".

Populating the resource assignment data structure can include the approach to use a search engine to search for resources possessing the requested skills, and then to slot the resource into the resource assignment data structure based on availability. Yet, there are alternatives, which are discussed briefly below.

Consider the case of the resource assignment scenario shown in Table 4

TABLE 4

Resource Assignment Scenario

| | |
|---|---|
| Requested Qualifications | Java Programmer |
| | Java Skill Level 4 |
| | Bachelor of Science |
| | PS Query 5 |
| Requested Work Period | Jan. 03, 2011 to Jan. 30, 2011 (4 weeks) |
| Candidate Resources | |
| | Resource ABC |
| | |
| | Java Programmer |
| | Java Skill Level 3 |
| | PS Query 4 |
| | Bachelor of Business Administration |
| | Available weeks 2, 3 and 4 |
| | Resource DEF |
| | |
| | Java Programmer |
| | Java Skill Level 4 |
| | PS Query 4 |
| | Bachelor of Business Administration |
| | Available only week 4 |

And further consider the candidate resource descriptions as follows. The candidate resource is named (e.g., "ABC"), various qualifications (e.g., "Java Skill") and proficiencies (e.g., "Java Skill 3") are given, and available times are listed (e.g., "AvailableTime"):

Candidate Resource ABC

```
<Resource name="ABC">
    <Qualifications>
        <QUAL>Java Skill</QUAL>
        <PRO>Java Skill Level 3</PRO>
        <QUAL>PS Query</QUAL>
        <PRO>PS Query 4</PRO>
        <DEG>Bachelor of Business
            Administration</DEG>
    </Qualifications>
    <AvailableTime>
        <WeekId> 2</WeekId>
```

-continued

```
        <WeekId> 3</WeekId>
        <WeekId> 4</WeekId>
    </AvailableTime>
</Resource>
```

Candidate Resource DEF

```
<Resource name="DEF">
    <Qualifications>
        <QUAL>Java Skill</QUAL>
        <PRO>Java Skill Level 4</PRO>
        <QUAL>PS Query</QUAL>
        <PRO>PS Query 4</PRO>
        <DEG>Bachelor of Business
        Administration</DEG>
    </Qualifications>
    <AvailableTime>
        <WeekId> 4</WeekId>
    </AvailableTime>
</Resource>
```

Figure 1B:
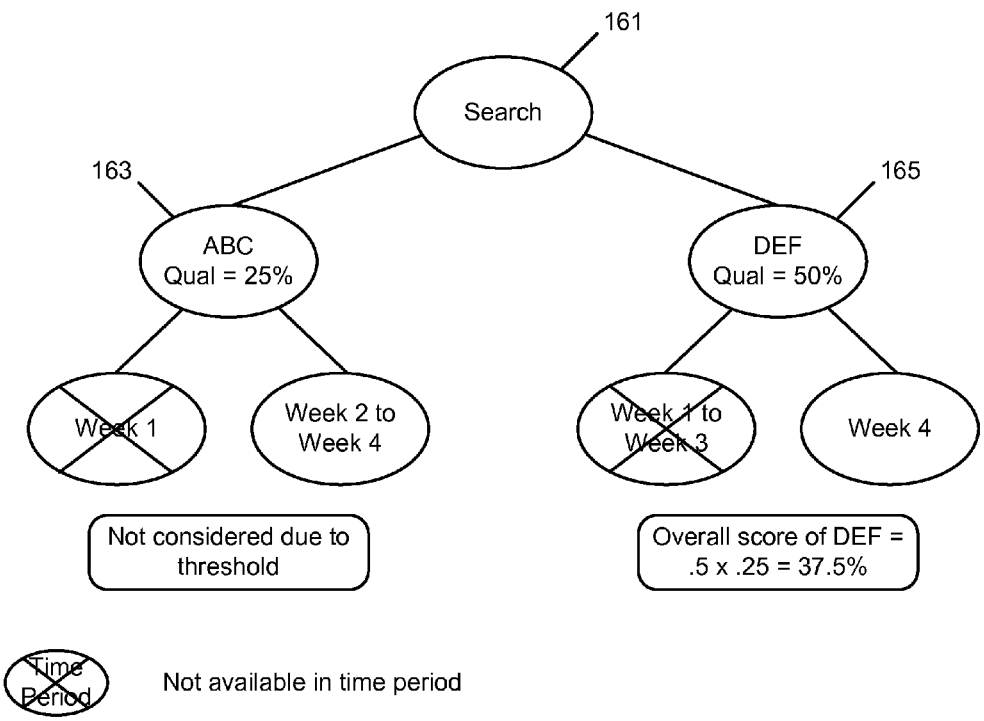
FIG. 1B illustrates a two-level search tree with single-level score calculation according to some embodiments.

FIG. 1B illustrates a two-level search tree with single-level score calculation according to the above scenario. As per the earlier discussion, operations commence to search (see node 161) a resource repository to return candidate resource records having at least one of the requested qualifications and calculate the qualification match scores. In this example, a particular candidate resource's qualification match score is calculated based on the number of matched qualifications with respect to the requested qualifications. That is, candidate resource ABC (see node 163) possesses only one requested qualification "Java Skill Level 4", and candidate resource DEF (see node 165) possesses only two of the requested qualifications, namely qualification "Java Programmer" and qualification "Java Skill Level 4". Thus, the qualification match scores can be calculated as follows:

Qualification Match Score for Resource $ABC$:1 of 4*100%=25%

Qualification Match Score for Resource $DEF$:2 of 4*100%=50%

If the qualification match score threshold is 50%, only resource DEF will be retained for assignment.

Following the example of this FIG. 1B, the availability for resources retained in the previous step are calculated. The resource request indicated a need for four weeks of service, however the resource DEF is available only for one week, and thus receives a low availability match score, calculated as follows:

Availability Match Score for Resource $DEF$:1 week of 4 weeks*100%=25%

The next step is to calculate an overall match score for a resource:

[(Qualification Match Score)+(Availability Match Score)]/2=Overall Match Score

Overall Match Score for Resource $DEF$:[(50%+ 25%)]/2=37.5%

However, resource ABC actually has a higher overall match score than resource DEF, but the result following the example of FIG. 1B does not reflect this fact because resource ABC was trimmed from the list in the search and qualification match score threshold filter operations. Resource ABC is available three out of the four requested weeks, so resource ABC availability match score=3 of 4*100%=75%.

Thus, the resource ABC overall match score=[(25%+ 75%)]/2=50%. As can be seen, improvements can be made if the search and filter step were to consider the qualification match score and the availability match score in combination. A technique for concurrent calculation of resource qualification and availability using text search is presented in the following discussion of FIG. 1C.

Figure 1C:
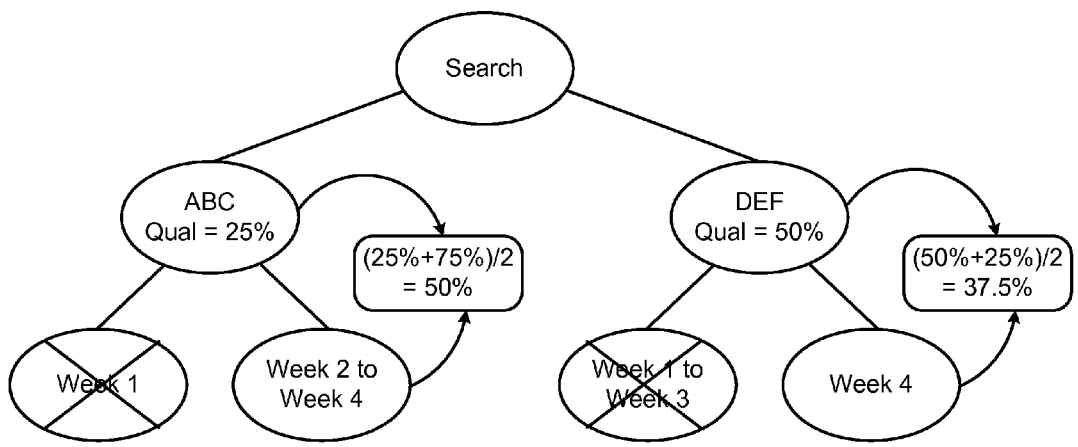
FIG. 1C illustrates a two-level search tree with multi-level score calculation, according to some embodiments

FIG. 1C illustrates a two-level search tree with multi-level score calculation. In comparing the technique of FIG. 1B to the technique of FIG. 1C, and as shown, the qualification match score and the availability match score are considered in combination, and the overall match score for each resource is calculated in one step.

The search returns candidate resource records having at least one of the requested qualifications, in this example as in the previous example, candidate resource ABC possesses one requested qualification "Java Skill Level 4", and candidate resource DEF possesses two of the requested qualifications, namely qualification "Java Programmer" and qualification "Java Skill Level 4". Also, the resource availability is the same as in the previous example. However, and contrasting from the previous example, overall match scores can be calculated as follows:

Overall Match Score for Resource $ABC$:[(25%)+ (75%)]/2=50%

Overall Match Score for Resource $DEF$:[(50%)+ (75%)]/2=37.5%

If the qualification match score threshold is 50%, only resource ABC will be retained for assignment. Such a search technique as presented in the discussion of this FIG. 1C can be used in embodiments for concurrent calculation of resource qualification and availability using text search.

FIG. 1D illustrates an environment 100 for implementing concurrent calculation of resource qualification and availability using text search. Some of the features of the environment 100 of FIG. 1D are similar to corresponding features found in FIG. 1A. However, FIG. 1D is distinguished at least by the appearance of the operation 130, a step to retrieve a sample of candidate resource records based on a combination of qualifications and availability. Such an operation 130 operates in combination with a text search engine 125 for retrieving from the resource repository 102. In some embodiments, the operation 130 operates in combination with a text search engine 125 to configure a query 131 to request retrieval of candidate resource records based on the qualifications and availability given in a resource request.

Figure 2:
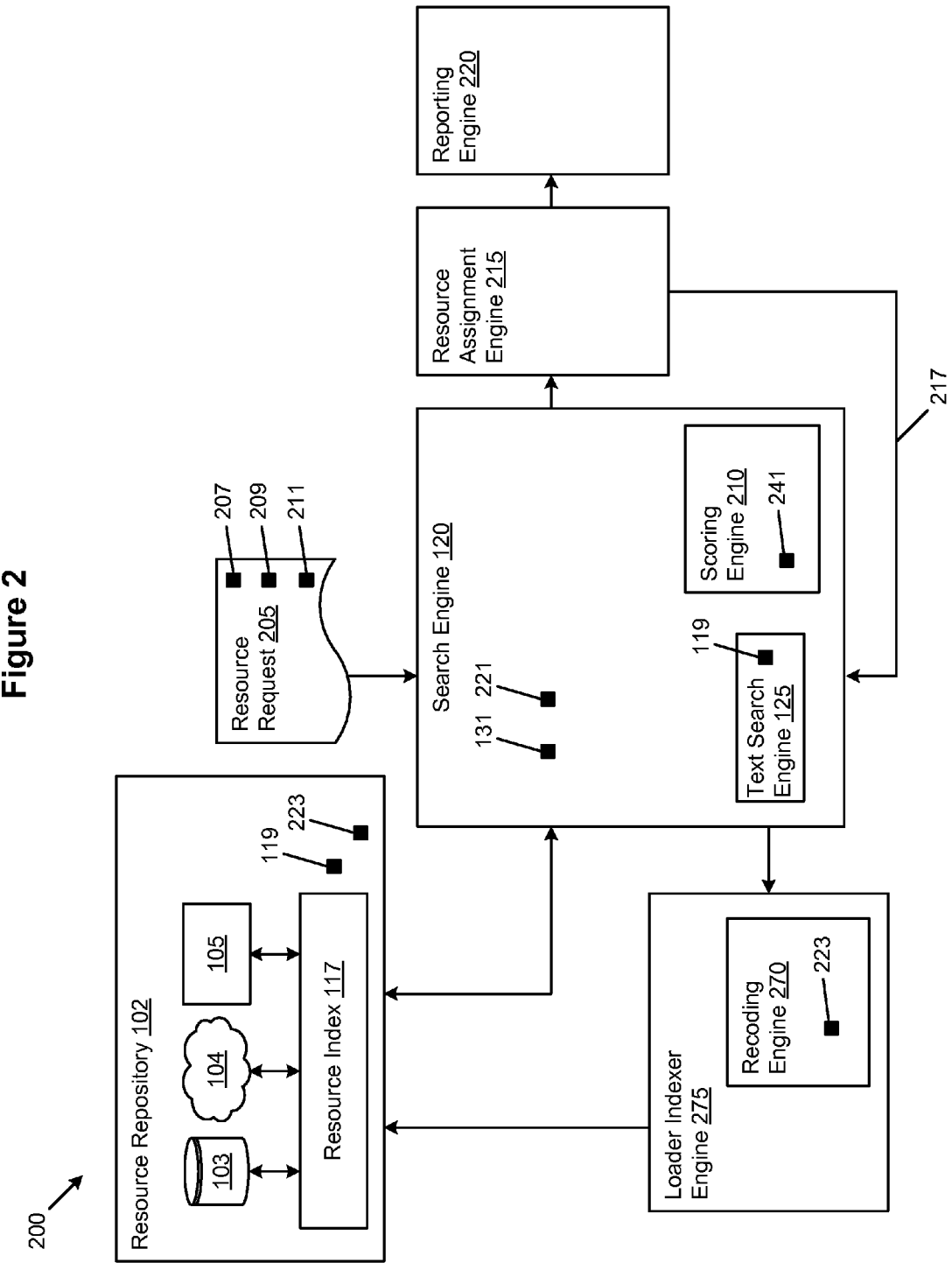
FIG. 2 is a block diagram of a system for performing concurrent calculation of resource qualification and availability using text search, according to some embodiments.

FIG. 2 is a block diagram of a system 200 for performing concurrent calculation of resource qualification and availability using text search. Exemplary operation of the present system 200 commences when the search engine 120 receives a resource request 205, comprising at least a qualification requirement indication 207 and a time period requirement indication 209, and possibly also a proficiency level requirement indication 211. Then the search engine 120 forms a query 131 to retrieve a one or more matching candidate resource records 221 based on qualifications given in a resource request. Operation continues by using the query to retrieve from resource repository 102 the requested candidate resource records that match the query (e.g., matching candidate resource records 221). To perform concurrent calculation of resource qualification and availability using text search, candidate resource records from the results set are recoded so as to form one or more recoded candidate resource documents 223 which recoded candidate resource documents 223 are suitable for retrieval using text search engine 125, possibly in combination with the search engine 120. The recoding can be performed by any module or engine. As shown in system 200, the recoding is performed using a recoding engine 270 within loader indexer engine 275, which recoding operations result in recoded candidate resource documents 223 that are processed by a loader indexer engine 275, which in turn serves to store the recoded candidate resource documents 223 in a query-accessible portion of the resource repository. The recoding of and retrieval of recoded candidate resource documents can occur iteratively. In some cases, operations to performing recoding occur in a batch process, which batch process executes periodically, or on demand (e.g., when a new resource is added to the resource repository).

The system 200 proceeds to score or otherwise evaluate recoded resource documents using the search engine 120, which search engine can score during a search operation. A software module within the search engine 120 (or a scoring engine 210) can be configured to evaluate recoded candidate resource documents in order to match the qualification requirements to the recoded candidate resource documents 223 and in order to match recoded candidate resource documents that are found to have availability during at least some of the time period indicated in the resource request. Then, having at least some such recoded candidate resource documents, a resource assignment engine 215 can assign the selected resource and schedule the selected resource into the project schedule. For example, if resource ABC were available three out of the four requested weeks in the project schedule, then resource ABC can be assigned for those three weeks, and scheduled into the project schedule for those same three weeks.

In some cases, the project schedule can be fully satisfied based on the aforementioned flow, and in such as case, the assignment and schedule of the project can be reported using a reporting engine 220. In other cases, it is possible that the project schedule cannot be fully satisfied based on the aforementioned flow, and in such as case, it is possible that the system will return (see path 217) to processing in the search engine 120, in the expectation of finding additional resources. In some cases an operator may lower a threshold in an attempt of finding additional resources that were filtered in earlier retrieval and match operations.

Figure 3:
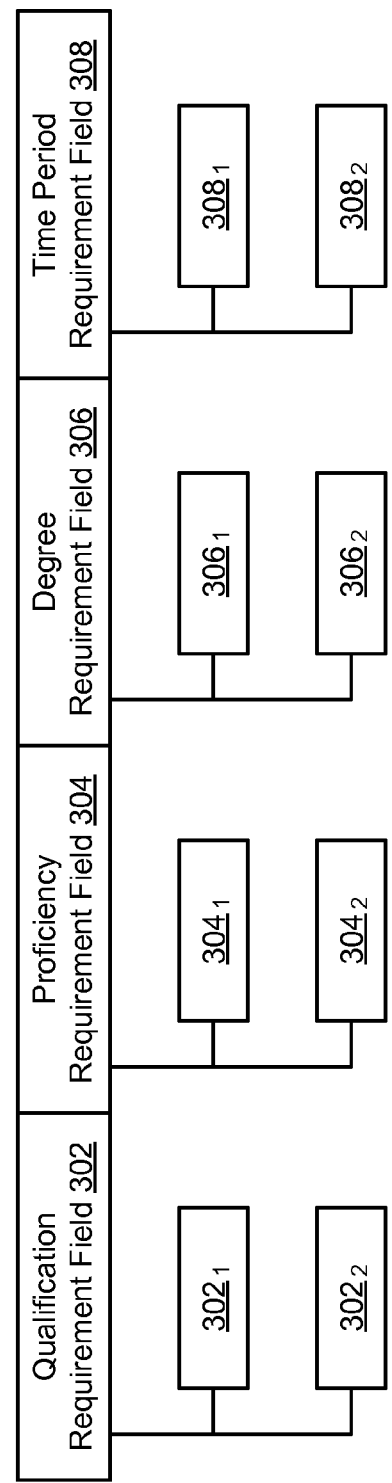
FIG. 3 depicts a data structure for a resource request, according to some embodiments.

FIG. 3 depicts a data structure for a resource request. A resource request data structure 300 comprises a plurality of fields to capture details of the resource request, including qualifications and timeframes of need. For example, a project may require some staffing by resources possessing particular qualifications, and the project may be specified to progress within some particular timeframe, during which timeframe the specific resources possessing particular qualifications are needed.

As shown, the resource request data structure 300 comprises a plurality of requirement fields, namely a qualification requirement 302, a proficiency requirement 304, a degree requirement 306, and a time period requirement 308. Further, any of such fields can in turn comprise additional data structures (or pointers to data structures) to codify as precisely as may be needed to distinguish one resource request from another resource request. For example, the qualification requirement 302 can comprise any one or more specific qualifications, such as "Java Programmer", or "PS Reporting", and such one or more specific qualifications can be codified using a subfield (e.g., qualification requirement field $302_1$, qualification requirement field $302_2$). The proficiency requirement 304 can comprise any one or more specific proficiencies, such as "Java Skill Level 3", or "PS Reporting Skill Level 4", and such one or more can be codified using a subfield (e.g., proficiency field $304_1$, proficiency field $304_2$). In similar fashion, the degree requirement 306 can comprise any one or more specific degree specifications, such as "Bachelor of Business Administration", or "Bachelor of Science", and such one or more degree qualifications can be codified using a subfield (e.g., degree requirement field $306_1$, degree requirement field $306_2$). A qualification requirement can comprise any mixture of a qualification requirement, a proficiency requirement and/or a degree requirement.

Also, the time period requirement 308 can comprise any one or more specific time period specifications such as "Year 2011", or "Month of June", or "Work Week 22", or "Day 260", and such one or more can be codified using a subfield (e.g., time period requirement field $308_1$, time period requirement field $308_2$).

The specific data structure shown in FIG. 3 is purely exemplary, and a resource request data structure 300 can comprises a qualification, a proficiency, a degree, and a time period requirement in a variety of other representations. For example, a resource request data structure 300 can be presented and received in the form of an XML document, or a portion of an XML document. And an XML document, or a portion of an XML document can codify one or more qualifications, proficiencies, degrees, and time period requirements in a text representation. A portion of an XML document is presented hereunder:

```
<ResourceRequirements>
    <QualificationRequirements>
        <QUAL>Java Skill</QUAL>
        <PRO>Java Skill 3</PRO>
        <QUAL>PS Query</QUAL>
        <PRO>PS Query 4</PRO>
        <QUAL>PS Reporting</QUAL>
        <PRO>PS Reporting 3</PRO>
        <DEG>Bachelor of Business Administration</DEG>
    </QualificationRequirements>
    <AvailableTimeRequirements>
        <Year>2011</Year>
        <MonthId>1</MonthId>
        <WeekId> 2</WeekId>
        <WeekId> 3</WeekId>
        <WeekId> 4</WeekId>
        <WeekId> 5</WeekId>
         <DateId> 10</DateId>
         <DateId> 11</DateId>
          . . . .
         <DateId> 28</DateId>
          . . . .
         <DateId> 260</DateId>
    </AvailableTimeRequirements>
</ResourceRequirements>
```

Figure 4:
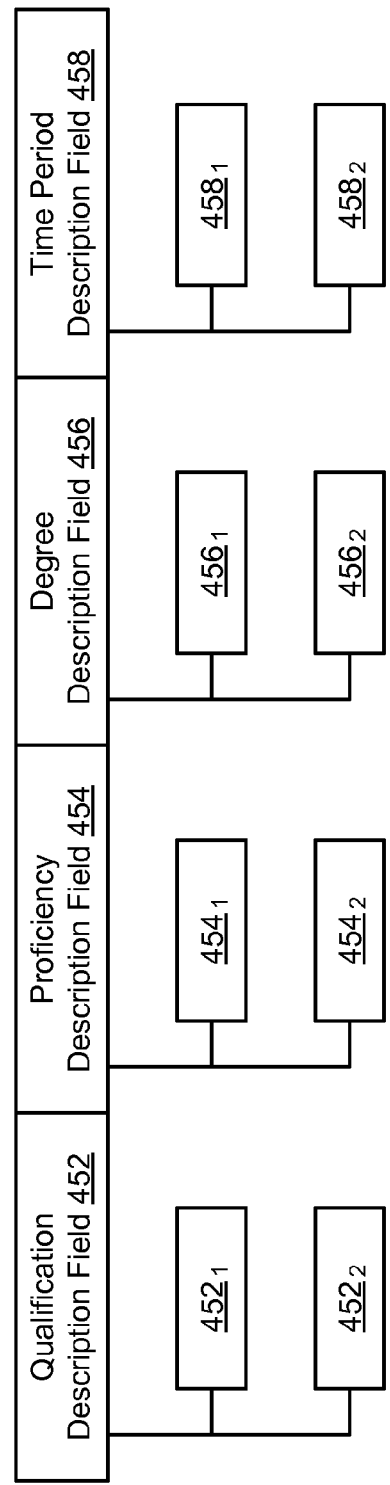
FIG. 4 depicts a data structure for a recoded candidate resource document, according to some embodiments.

FIG. 4 depicts a data structure for a recoded candidate resource document. A recoded candidate resource document 400 comprises a plurality of fields to capture details of the candidate resource, including qualifications possessed and timeframes of availability. For example, a candidate resource may possess particular qualifications, and the candidate resource may be available only during certain particular timeframes, during which timeframe the candidate resource can perform assigned duties. Conversely, a candidate resource may not be available (e.g., during vacations, other committed periods, etc.), during which timeframe the specific resource is not available to perform.

As shown, the recoded candidate resource document 400 comprises a plurality of fields, namely a qualification description 452, a proficiency description 454, a degree description 456, and a time period availability description 458. Further any of such fields can in turn comprise additional data structures (or pointers to data structures) to codify as precisely as may be needed to distinguish one candidate resource from another candidate resource. For example, the qualification description 452 can comprise any one or more specific qualifications, such as "Java Programmer", or "PS Reporting", and such one or more specific qualifications can be codified using a subfield (e.g., qualification description field $452_1$, qualification description field $452_2$). The proficiency description 454 can comprise any one or more specific proficiencies, such as "Java Skill Level 3", or "PS Reporting Skill Level 4", and such one or more can be codified using a subfield (e.g., proficiency description field $454_1$, proficiency description field $454_2$). In similar fashion, the degree description 456 can comprise any one or more specific degree specifications, such as "Bachelor of Business Administration", or "Bachelor of Science", and such one or more degree qualifications can be codified using a subfield (e.g., degree description field $456_1$, degree description field $456_2$). A qualification description can comprise any mixture of a qualification description, a proficiency description, and/or a degree description.

Also, the time period availability description 458 can comprise any one or more specific time period specifications such as "Year 2011", or "Month of June", or "Work Week 22", or "Day 260", and such one or more can be codified using a subfield (e.g., time period description field $458_1$, time period description field $458_2$).

The specific data structure shown in FIG. 4 is purely exemplary, and a recoded candidate resource document 400 can comprises a qualification, a proficiency, a degree, and a time period requirement in a variety of other representations. For example, a recoded candidate resource document 400 can be presented and received in the form of an XML document, or a portion of an XML document. And an XML document, or a portion of an XML document can codify one or more qualifications, proficiencies, degrees, and time periods in a text representation. A portion of an XML document is presented hereunder:

```
<CandidateResource>
    <QualificationDescriptions>
        <QUAL>Java Skill</QUAL>
        <PRO>Java Skill 3</PRO>
        <QUAL>PS Query</QUAL>
        <PRO>PS Query 4</PRO>
        <QUAL>PS Reporting</QUAL>
        <PRO>PS Reporting 3</PRO>
        <DEG>Bachelor of Business Administration</DEG>
    </QualificationDescriptions>
    <AvailableTimePeriods>
        <Year>2011</Year>
        <MonthId>1</MonthId>
        <WeekId> 2</WeekId>
        <WeekId> 3</WeekId>
        <WeekId> 4</WeekId>
        <WeekId> 5</WeekId>
         <DateId> 10</DateId>
         <DateId> 11</DateId>
         . . . .
         <DateId> 28</DateId>
         . . . .
         <DateId> 260</DateId>
    </AvailableTimePeriods>
</CandidateResource>
```

The presented portion of an XML document (as given above) can be included in an XML document that comprises a qualifications possessed portion (e.g., using the QualificationDescriptions tag and contents) to serve as the qualification description 452. Similarly, timeframes of availability portion (e.g., using the <AvailableTimePeriods> tag and contents) serve as the time period availability description 458.

Figure 5:
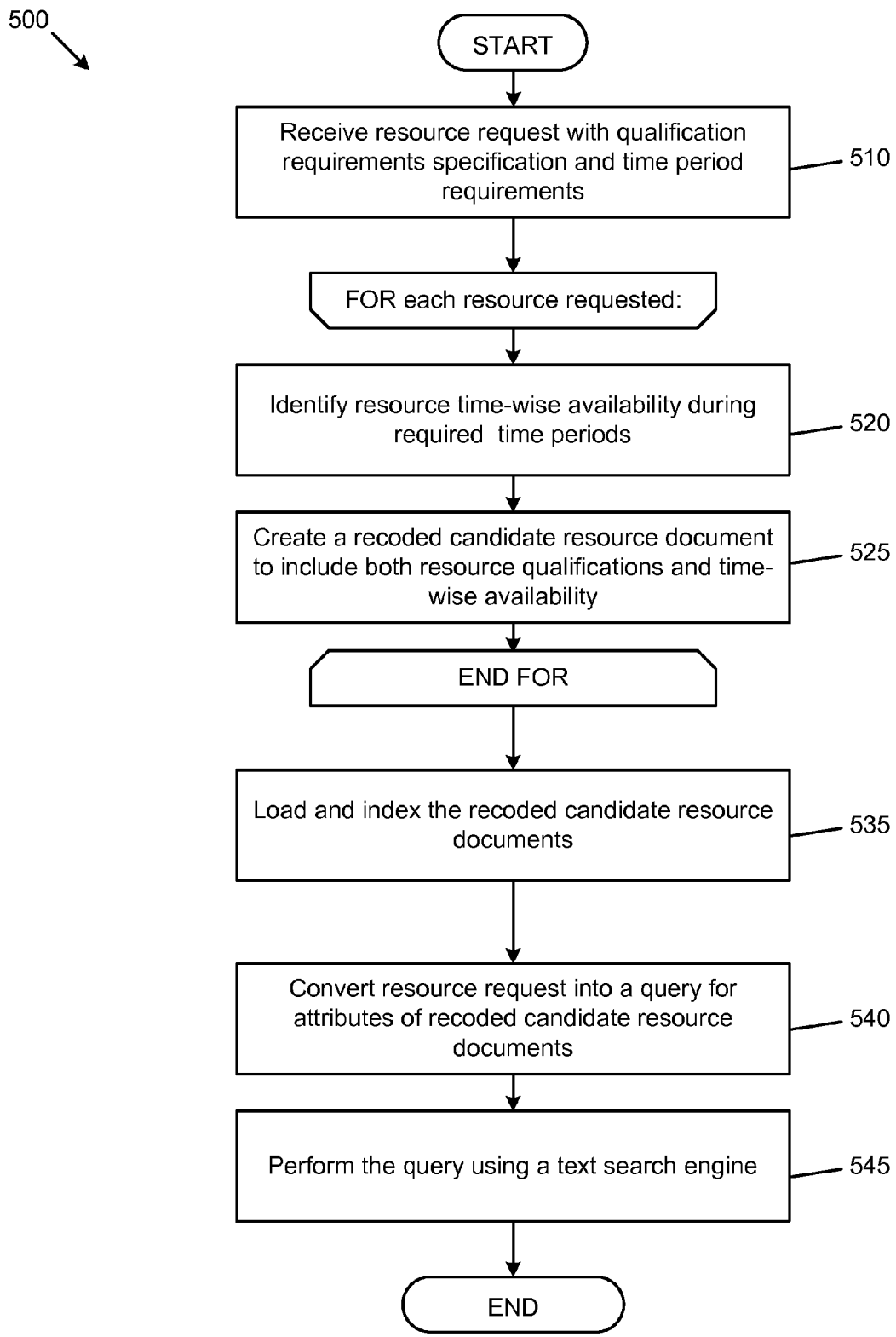
FIG. 5 is a system for performing concurrent calculation of resource qualification and availability using text search for retrieving candidate qualified resource availability documents, according to some embodiments.

FIG. 5 is a subsystem 500 for performing concurrent calculation of resource qualification and availability using text search when retrieving candidate qualified resource availability documents. The steps of the present subsystem 500 serve to implement many of the functions of the system 200. For example the steps of the present subsystem 500 can be performed in the context of a search engine 120.

As shown, the subsystem commences by receiving a resource request, (e.g., at a server or in a search engine), the resource request comprising a qualification requirement indication, a proficiency level requirement indication, and a time period requirement indication (see operation 510). The time periods are calculated to as to be expressed in the units as may be converted (e.g., one week equal 5 working days, one working day equal 8 working hours, etc.).

Upon receiving a resource request (see operation 510), a query is formed and resources are retrieved from the resource repository. The query may be a broad query (e.g., query only on a few qualifications) or may be more narrow query. For each resource retrieved from the resource repository, the available time periods are calculated. The available time periods are the time periods that the resource is available to work. In one embodiment, available time periods are deemed to be time periods not blocked-out (e.g., covering non-working periods such as weekends and holidays and not occupied by other assignments or vacation or training, or other scheduled events in lieu of working hours). The time periods can be expressed in days, weeks, months and years, or if necessary in any other time unit. In some embodiments, a time period is given a machine-assigned unique time period identifier to identify itself. Rules can be configured to determine whether a day is deemed to be available; for example, in case part of the day is already occupied. Similar rules can be configured to decide whether a portion of a week is available.

For each resource retrieved, operation 520 and operation 525 serve to create a recoded candidate resource document, and each such recoded candidate resource document comprises both the qualifications and the available time period (e.g., using the unique time period identifiers). As earlier indicated, the same document (e.g., the recoded candidate resource document) can include further qualification descriptions (e.g., resource skills, proficiencies, degrees, etc.) so that one text query can search resources and calculate an overall match score 241 based on a qualification match score as well as an availability match score.

Once at least one candidate resource document has been created, the candidate resource document(s) are loaded (see operation 535) in a manner suited for searching by a text search engine. The recoding and indexing and loading operations can be performed by any module or engine, and can be performed at any time, or in any flow, possibly including during a batch-oriented flow for indexing and loading. The aforementioned recoding as well as the loading and indexing can be performed by any engine able to prepare the candidate resource documents to store the recoded candidate resource documents in a query-accessible portion of the resource repository.

Having stored the recoded candidate resource documents in a query-accessible portion of the resource repository such as a portion accessible via a resource query (see Query 1 and Query 2, and Query 3 below), then the recoded candidate resource documents can be retrieved via a resource query, in particular via a text-oriented query. For example, a text-oriented query can be formed from the resource request (see operation 540). As earlier described, a resource request contains search criteria in the form of qualification requirement indications, proficiency level requirement indications 211, and a time period requirement indications. Again, time periods expressed in any units can be converted into any other time period units, such as into days or weeks or months, and such conversion preferences can be based on a user's preferences.

Below is an example of a portion of a resource query, this particular query seeking to find matches for any/all of the weeks 1, 2, 3 or 4. And the query execution includes calculating a score (see DEFINESCORE) based on the returned matches. In the example below, if a resource were available for a work assignment during all of the requested weeks, then the score would ADD to 1=0.25+0.25+0.25+0.25.

Query 1:

```
DEFINEMERGE((
  (DEFINESCORE(( 1 WITHIN WeekId),DISCRETE*0.25)), --matched
  (DEFINESCORE(( 2 WITHIN WeekId),DISCRETE*0.25)), --matched
  (DEFINESCORE(( 3 WITHIN WeekId),DISCRETE*0.25)), --matched
  (DEFINESCORE(( 4 WITHIN WeekId),DISCRETE*0.25)) --matched
),OR,ADD)
```

In another case, if a resource were available for a work assignment during only three of the requested four weeks, then the score would ADD to 0.75=0.25+0.25+0.25.

Query 2:

```
DEFINEMERGE((
  (DEFINESCORE(( 1 WITHIN WeekId),DISCRETE*0.25)), --matched
  (DEFINESCORE(( 2 WITHIN WeekId),DISCRETE*0.25)), --matched
  (DEFINESCORE(( 3 WITHIN WeekId),DISCRETE*0.25)), --matched
  (DEFINESCORE(( 4 WITHIN WeekId),DISCRETE*0.25)) --not matched
),OR,ADD)
```

As regards scoring, in the examples shown above, each matched entry receives an equal weight (e.g., 0.25), however in other embodiments the user can control the weighting by specifying a weighting percentage.

Now, having the recoded candidate resource documents in a query-accessible portion of the resource repository, and having a resource query, the subsystem 500 progresses to invoke the text search engine 125 to process the query. Resources will be returned by the text search engine 125 when at least one qualification matches and when at least one available time period matches. Using the techniques described above (or any other techniques for that matter), the qualification match score, the availability match score, and the overall match score 241 is calculated for each resource returned in the result set returned by the text search engine 125.

The user can choose to trim the result set by setting the threshold to apply to any of the scores. More specifically, a threshold can be applied to an overall match score (e.g., using an overall match score threshold), or a threshold can be applied to a qualification match score (e.g., using a qualification match score threshold), or a threshold can be applied to a qualification match score (e.g., using an availability match score threshold). In exemplary embodiments the overall match score is compared to an overall match score threshold, and thus, certain resources can be filtered out (or selected in).

The above queries, namely Query 1 and Query 2, exemplify the portion of a query for retrieving recoded candidate resource documents that match at least some time periods, yet, as aforementioned, a query can be created to support concurrent calculation of resource qualifications and availability using a text search. Moreover, calculation of an overall match score can be accomplished in a single query. The Query 3, presented below is such a query.

Query 3:

```
DEFINEMERGE((
  (DEFINESCORE((Java Skill WITHIN QUAL),DISCRETE*0.5*0.5*0.5)),
  (DEFINESCORE((Java Skill 4 WITHIN PRO),DISCRETE*0.5*0.5*0.5)),
  (DEFINESCORE((Bachelor of Science WITHIN DEG),DISCRETE*0.5*0.5)),
  (DEFINESCORE(( 1 WITHIN WeekId),DISCRETE*0.5*0.25)),
  (DEFINESCORE(( 2 WITHIN WeekId),DISCRETE*0.5*0.25)),
  (DEFINESCORE(( 3 WITHIN WeekId),DISCRETE*0.5*0.25)),
  (DEFINESCORE(( 4 WITHIN WeekId),DISCRETE*0.5*0.25))
),OR,ADD)
```

Returning to the example presented above as pertaining to Resource ABC and Resource DEF, the DEFINESCORE portions of the query are calculated as follows:

Resource ABC overall match score:0.125+ 0.5*0.25*3=0.5=50%

Resource DEF overall match score:0.125+0.125+ 0.5*0.25=0.375=37.5%

Accordingly, both resources ABC and DEF are returned and Resource ABC can be preferred over Resource DEF to fill the request as Resource ABC has higher overall match score.

Figure 6:
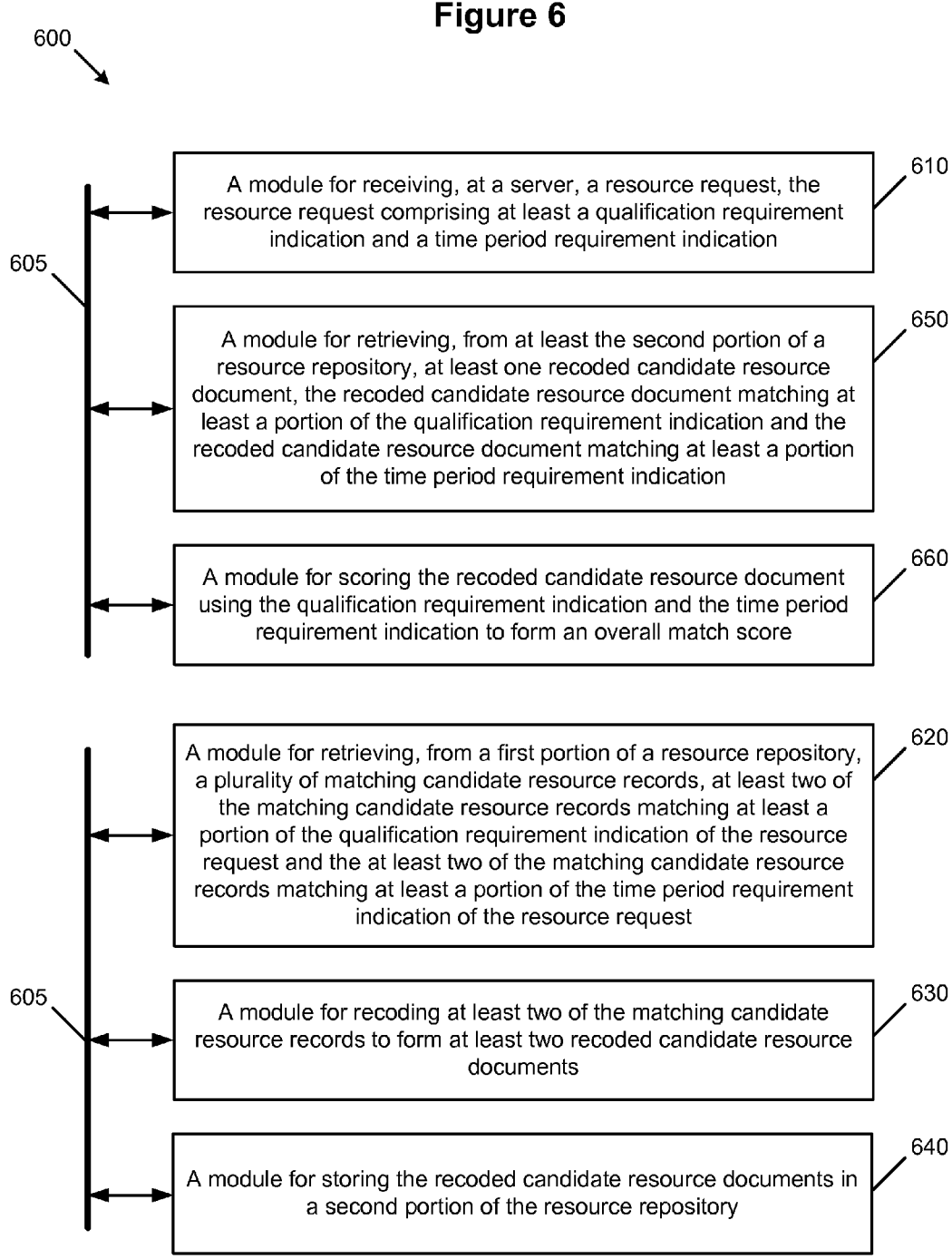
FIG. 6 depicts a block diagram of a system for concurrent calculation of resource qualification and availability using text search, according to some embodiments.

FIG. 6 depicts a block diagram of a system for concurrent calculation of resource qualification and availability using text search. As an option, the present system 600 may be implemented in the context of the architecture and functionality of the embodiments described herein. Of course, however, the system 600 or any operation therein may be carried out in any desired environment. As shown, system 600 comprises a plurality of modules, a module comprising at least one processor and a memory, each connected to a communication link 605, and any module can communicate with other modules over communication link 605. The modules of the system can, individually or in combination, perform method steps within system 600. Any method steps performed within system 600 may be performed in any order or grouping, including performing a request flow asynchronously from an index loading flow, and any arrangement of method steps are possible unless as may be explicitly specified in the claims. As shown, system 600 implements a method for concurrent calculation of resource qualification and availability using text search, the system 600 comprising modules for: receiving, at a server, a resource request, the resource request comprising at least a qualification requirement indication and a time period requirement indication (see module 610); retrieving, from a first portion of a resource repository, a plurality of matching candidate resource records, at least two of the matching candidate resource records matching at least a portion of the qualification requirement indication of the resource request and the at least two of the matching candidate resource records matching at least a portion of the time period requirement indication of the resource request (see module 620); recoding at least two of the matching candidate resource records to form at least two recoded candidate resource documents (see module 630); storing the recoded candidate resource documents in a second portion of the resource repository (see module 640); retrieving, from at least the second portion of a resource repository, at least one recoded candidate resource document, the recoded candidate resource document matching at least a portion of the qualification requirement indication and the recoded candidate resource document matching at least a portion of the time period requirement indication (see module 650); and scoring the recoded candidate resource document using the qualification requirement indication and the time period requirement indication to form an overall match score (see module 660).

System Architecture Overview

Figure 7:
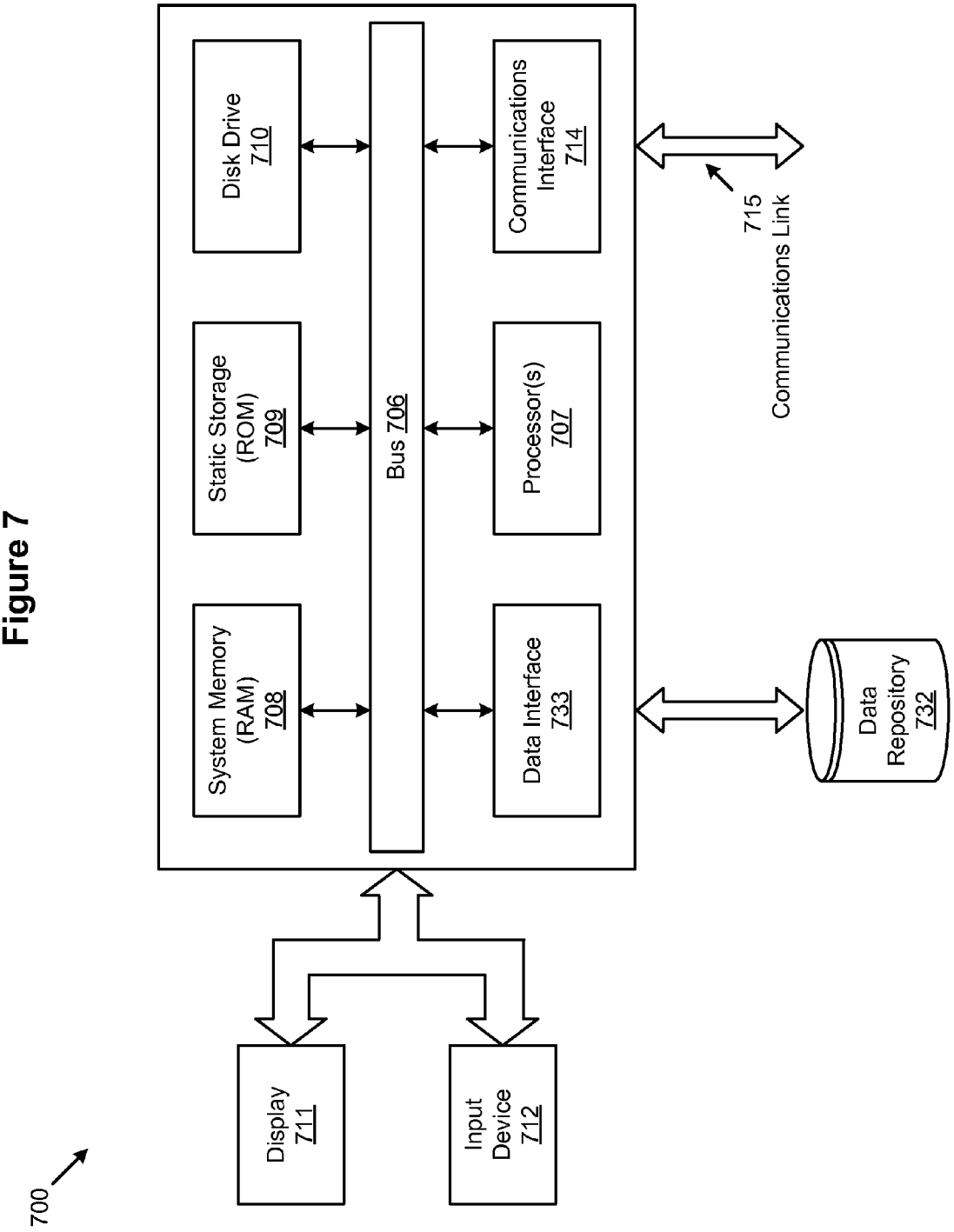
FIG. 7 illustrates a computer system on which an embodiment of the claims can be implemented.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device 709 (e.g., ROM), a disk drive 710 (e.g., magnetic or optical), a data interface 733, a communications interface 714 (e.g., modem or Ethernet card), a display 711 (e.g., CRT or LCD), input devices 712 (e.g., keyboard, cursor control), and an external data repository 732.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device 709 or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to other embodiments of the disclosure, two or more computer systems 700 coupled by a communication link 715 (e.g., LAN, PTSN, or wireless network) may perform the sequence of instructions required to practice the disclosure in coordination with one another.

Computer system 700 may transmit and receive messages, data, and instructions, including program, i.e., application code, through communication link 715 and communications interface 714. Received program code may be executed by processor 707 as it is received, and/or stored in disk drive 710 or other non-volatile storage for later execution.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A computer implemented method for concurrent calculation of resource qualification and availability using text search, the method comprising:

receiving, at a server, a resource request, the resource request comprising at least a qualification requirement indication and a time period requirement indication, wherein the time period requirement indication indicates a period of availability needed for the resource request;

retrieving, from a first portion of a resource repository, a plurality of matching candidate resource records, at least two of the matching candidate resource records matching at least a portion of the qualification requirement indication of the resource request and the at least two of the matching candidate resource records matching at least a portion of the time period requirement indication of the resource request;

recoding at least two of the matching candidate resource records to form at least two recoded candidate resource documents;

storing the recoded candidate resource documents in a second portion of the resource repository;

converting the resource request into a text query, wherein the text query scores the recoded candidate resource documents using both availability and qualification corresponding to the recoded candidate resource documents;

retrieving, in response to the text query, from at least the second portion of the resource repository, at least one recoded candidate resource document, the recoded candidate resource document matching at least a portion of the qualification requirement indication and the recoded candidate resource document matching at least a portion of the time period requirement indication;

scoring the recoded candidate resource document using the qualification requirement indication and the time period requirement indication to form an overall match score, wherein the overall match score is formed by concurrently calculating a qualification match score and an availability match score for the recoded candidate resource document, wherein the overall match score is calculated prior to assigning one or more resources to the resource request; and assigning one or more resources based at least in part on the overall match score.

2. The method of claim 1, wherein the recoding is performed in a batch process.

3. The method of claim 1, wherein the recoded candidate resource documents are recoded into an extensible markup language (XML) document.

4. The method of claim 3, wherein the extensible markup language (XML) document comprises a qualifications possessed portion and a timeframes of availability portion.

5. The method of claim 1, wherein the overall match score is calculated by a formula $$[(\text{qualification match score})+(\text{availability match score})]/2=\text{overall match score}.$$

6. The method of claim 5, wherein the availability match score is compared to an availability match score threshold.

7. A computer system for concurrent calculation of resource qualification and availability using text search comprising:

a computer processor to execute a set of program code instructions; and a memory to hold the program code instructions in which the program code instructions comprise program code to perform receiving a resource request, the resource request comprising at least a qualification requirement indication and a time period requirement indication, wherein the time period requirement indication indicates a period of availability needed for the resource request;

to perform retrieving, from a first portion of a resource repository, a plurality of matching candidate resource records, at least two of the matching candidate resource records matching at least a portion of the qualification requirement indication of the resource request and the at least two of the matching candidate resource records matching at least a portion of the time period requirement indication of the resource request;

to perform recoding at least two of the matching candidate resource records to form at least two recoded candidate resource documents;

to perform storing the recoded candidate resource documents in a second portion of the resource repository;

to perform converting the resource request into a text query, wherein the text query scores the recoded candidate resource documents using both availability and qualification corresponding to the recoded candidate resource documents;

to perform retrieving, in response to the text query, from at least the second portion of the resource repository, at least one recoded candidate resource document, the recoded candidate resource document matching at least a portion of the qualification requirement indication and the recoded candidate resource document matching at least a portion of the time period requirement indication; and to perform scoring the recoded candidate resource document using the qualification requirement indication and the time period requirement indication to form an overall match score, wherein the overall match score is formed by concurrently calculating a qualification match score and an availability match score for the recoded candidate resource document, wherein the overall match score is calculated prior to assigning one or more resources to the resource request; and to perform assigning one or more resources based at least in part on the overall match score.

8. The computer system of claim 7, wherein the recoding is performed in a batch process.

9. The computer system of claim 7, wherein the recoded candidate resource documents are recoded into an extensible markup language (XML) document.

10. The computer system of claim 9, wherein the extensible markup language (XML) document comprises a qualifications possessed portion and a timeframes of availability portion.

11. The computer system of claim 7, wherein the overall match score is calculated by a formula

[(qualification match score)+(availability match score)]/2=overall match score.

12. The computer system of claim 11, wherein the availability match score is compared to an availability match score threshold.

13. A computer program product embodied in a non-transitory computer readable medium, the computer readable medium having stored thereon a sequence of instructions which, when executed by a processor causes the processor to execute a method to perform concurrent calculation of resource qualification and availability using text search, the method comprising:

receiving, at a server, a resource request, the resource request comprising at least a qualification requirement indication and a time period requirement indication, wherein the time period requirement indication indicates a period of availability needed for the resource request;

retrieving, from a first portion of a resource repository, a plurality of matching candidate resource records, at least two of the matching candidate resource records matching at least a portion of the qualification requirement indication of the resource request and the at least two of the matching candidate resource records matching at least a portion of the time period requirement indication of the resource request;

recoding at least two of the matching candidate resource records to form at least two recoded candidate resource documents;

storing the recoded candidate resource documents in a second portion of the resource repository;

converting the resource request into a text query, wherein the text query scores the recoded candidate resource documents using both availability and qualification corresponding to the recoded candidate resource documents;

retrieving, in response to the text query, from at least the second portion of the resource repository, at least one recoded candidate resource document, the recoded candidate resource document matching at least a portion of the qualification requirement indication and the recoded candidate resource document matching at least a portion of the time period requirement indication; and scoring the recoded candidate resource document using the qualification requirement indication and the time period requirement indication to form an overall match score wherein the overall match score is formed by concurrently calculating a qualification match score and an availability match score for the recoded candidate resource document, wherein the overall match score is calculated prior to assigning one or more resources to the resource request; and assigning one or more resources based at least in part on the overall match score.

14. The computer program product of claim 13, wherein the recoding is performed in a batch process.

15. The computer program product of claim 13, wherein the recoded candidate resource documents are recoded into an extensible markup language (XML) document.

16. The computer program product of claim 15, wherein the extensible markup language (XML) document comprises a qualifications possessed portion and a timeframes of availability portion.

17. The computer program product of claim 13, wherein the overall match score is calculated by a formula

[(qualification match score)+(availability match score)]/2=overall match score.

* * * * *

UNITED STATES PATENT AND TRADEMARK OFFICE
CERTIFICATE OF CORRECTION

PATENT NO. : 9,165,011 B2  
APPLICATION NO. : 13/251038  
DATED : October 20, 2015  
INVENTOR(S) : Wang et al.

Page 1 of 1

It is certified that error appears in the above-identified patent and that said Letters Patent is hereby corrected as shown below:

On the title page item [56],

Page 2, column 2, line 2, delete "www.gaganttic.com." and insert -- www.ganttic.com. --, therefor.

In the specification,

Column 2, line 67, delete "embodiments" and insert -- embodiments. --, therefor.

Column 5 (Table 3), line 50, delete "Java,Level 3" and insert -- Java Level 3 --, therefor.

Column 6, line 2, delete "Table 4" and insert -- Table 4. --, therefor.

Signed and Sealed this  
Seventh Day of June, 2016

Michelle K. Lee  
*Director of the United States Patent and Trademark Office*